Nov. 29, 1955　　　　　M. H. OLIN　　　　　2,724,855
VALVE MECHANISM FOR JOINT CONTROL OF WINDSHIELD
WIPING AND CLEANING APPARATUS
Filed April 28, 1951

INVENTOR.
MILO H. OLIN
BY
ATTORNEY

United States Patent Office 2,724,855
Patented Nov. 29, 1955

2,724,855

VALVE MECHANISM FOR JOINT CONTROL OF WINDSHIELD WIPING AND CLEANING APPARATUS

Milo H. Olin, Perry, N. Y.

Application April 28, 1951, Serial No. 223,560

14 Claims. (Cl. 15—250.4)

The present invention relates to windshield cleaning devices, and more particularly to combined windshield wipers and windshield washers for automotive vehicles. In a more specific aspect, the present application is an improvement on my pending U. S. patent application Serial No. 175,739, filed July 25, 1950, now Patent No. 2,712,147.

In my prior application, there is disclosed a combined windshield wiper and washer for automotive vehicles which can be actuated by stepping on a foot pedal. The device of my prior application has the advantage over prior conventional windshield cleaning mechanisms in that it can be put into operation without the driver of the vehicle having to remove either hand from the steering wheel. Furthermore, it has the advantage that with a single control device, namely, the foot pedal, both the wiper mechanism and the washer mechanism can be actuated. With prior conventional windshield cleaning apparatus two control knobs are required, one for controlling the flow of the cleaning liquid to the windshield, and the other for controlling oscillation of the windshield wiper. The device of my prior application has also the additional advantage that through the foot pedal the driver has complete control over the time the cleaning liquid is squirted on the windshield. Prior conventional windshield cleaning devices are so constructed that the cleaning liquid is squirted on the windshield for a limited period only and then is shut off. If the windshield is not clean at the end of the squirting period, the control knob for the cleaning liquid must be pressed in again. A further feature of the windshield cleaning mechanism of my prior application is that the cleaning liquid is delivered to the windshield under force of air pressure and not as in prior conventional apparatus through operation of engine vacuum. The only drawback of the mechanism of my prior application is that it is necessary to manually pull a control cable to restore the parts of the device to their starting positions after a period of use.

One object of the present invention is to provide a mechanism for wiping a windshield and applying a cleaning liquid thereto in which both operations are completely controlled both as to starting and stopping from a single control member.

A further object of the invention is to provide apparatus for wiping a windshield and for applying a cleaning liquid thereto which is constructed that by stepping on a single foot pedal, both the windshield wiper and the washer can be started and can be stopped.

Another object of the invention is to provide a combined windshield wiper and cleaner so constructed that the time of functioning of the cleaner is completely under control of the operator and the cleaning liquid will be delivered to the windshield for as long a continuous period as the operator desires, providing there is sufficient cleaning liquid available.

Still another object of the invention is to provide an improvement over the apparatus of my pending application which will be simpler in construction and cheaper.

A still further object of the invention is to provide a novel valve mechanism especially for a combined windshield wiper and washer in which a single reciprocable member, as for instance, a foot pedal, is operable to shift two valves which control, respectively, the wiper motor and the supply of cleaning liquid.

Other objects of the invention will be apparent hereinafter from the specification and from the recital of the appended claims.

Figure 1:
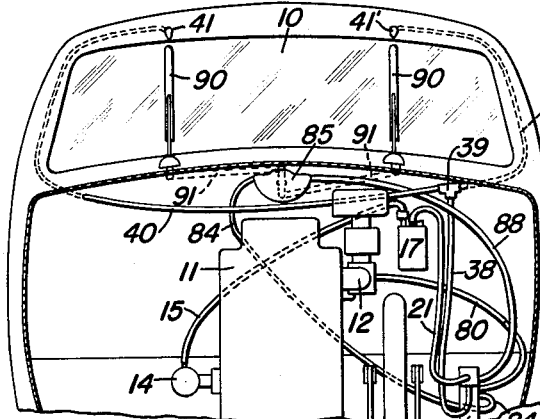
Fig. 1 is a fragmentary view partly in front elevation and partly in vertical section of an automotive vehicle equipped with a combined windshield wiper and cleaner system constructed according to one embodiment of this invention.

Referring now to the drawing by numerals of reference, 10 denotes the windshield of the vehicle; 11 is the engine block; and 12 is the intake manifold. Mounted at one side of the engine block is a conventional pneumatic booster pump 14 which is adapted to be operated by the engine and which is connected by a line 15 and a coupling 16 (Fig. 2) to the upper end of a liquid pressure tank 17. Tank 17 is adapted to contain the cleaning liquid. This tank may be filled through a port hole 18 which may be closed by a cap 19.

Within the tank 17 is a duct 20 which extends down close to the bottom of the tank and therefore draws the liquid from the bottom of the tank. This duct is connected by tubing 21 with a tubular nipple 22 (Fig. 4) that is threaded in a hole in one side of a valve casing 24.

The casing 24 is secured by screws or other suitable fastening means (not shown) beneath and to the floorboard 26 of the vehicle. The nipple 22 forms a seat for the reciprocable, conical-headed valve 30 whose stem portion 31 is guided by and slides in a sleeve member 32 and in a collar 33. Sleeve member 32 has a press-fit, or is otherwise secured in the nipple 22; and the collar 33 threads onto the right hand end of the sleeve member 32.

There is a duct 35 in the nipple 22 which extends at right angles to the bore of the nipple and which is adapted to communicate with that bore. Communication between the bore of the nipple and duct 35 is shut off when the valve 30 is seated. The duct 35 communicates with a duct 36 in one wall of the valve casing 24. The duct 36 is connected by tubing 38 with a coupling 39 (Fig. 1). This coupling is connected by tubing 40 and 40' with outlets 41 and 41', respectively, which are positioned to deliver the cleaning liquid onto the windshield 10 at the top thereof so that the liquid will flow down over the windshield by gravity.

Also housed in the valve casing 24 is a hollow sleeve valve 45. This is provided with a shoulder 46 and with a peripheral groove 47. The sleeve valve 45 is reciprocable in a cylinder formed within the casing 24 and denoted at 48. It is centered and slides on a rod 50 which is reciprocable in the casing 24. This rod extends upwardly through a hole in the top wall of casing 24 and through an aligned hole in the floor board 26, and can be pushed downwardly through a hole in the end plate 52 which closes the lower end of the cylinder 48. The rod has a foot pedal or button 53 secured to or integral with its upper end and positioned above the floor board 26.

The valve 45 is constantly urged upwardly by a coil spring 55, which is housed in the cylinder 48 and which abuts at its lower end against the end plate 52 and at its upper end against the lower end of the valve 45.

The rod 50 is constantly urged upwardly by a coil spring 57 which surrounds the rod within the valve 45 and within the spring 55. The spring 57 abuts at its lower end against the end plate 52 and at its upper end against a collar 58 that is pinned or otherwise fixedly secured to the rod 50.

Fastened to the rod 50 in any suitable manner, as by a set screw 59, is an actuating arm 60. The valve 30 is normally held in closed position by a leaf spring 61 which is secured by means of a rivet or screw 62' to the left hand lateral face of this arm 60. The spring 61 is adapted to abut against the right hand end of the valve stem 31.

Mounted upon the rod 50 below the collar portion 62 of the arm and above the valve 45 is a coil spring 65.

Pivotally mounted in the valve casing 24 is a detent 70. This detent is adapted to rock on a pin 71 that is secured in the valve casing. It is constantly urged toward engagement with the valve 45 by a coil spring 72 which is secured at one end to this detent 70 by a pin 73 and which is secured at its opposite end to the casing 24 by a pin 74.

The intake manifold 12 of the vehicle is connected by the tubing 80 with a port 81 in the cylinder 48. The cylinder 48 is connected by the port 83 and tubing 84 with one side of a conventional fluid pressure wiper operating motor 85 (Fig. 1). The cylinder 48 is connected by the port 87 and tubing 88 with the other side of this motor. This motor 85 may be connected in conventional fashion to the wiper blades 90 by conventional linkage 91 (Fig. 1).

Figure 2:
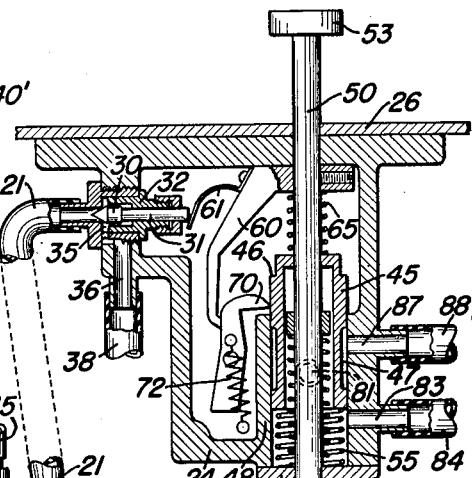
Fig. 2 is a vertical section showing the valve block and foot pedal for controlling the operation of the apparatus of this invention and showing the connection of the pressure tank, which contains the cleaning liquid, with the valve block, the apparatus being shown in its starting or inoperative position.
Figure 3:
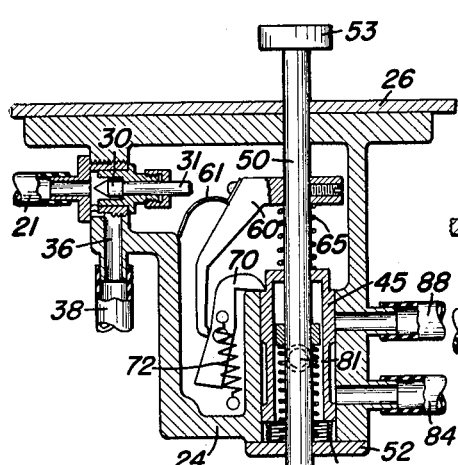
Fig. 3 is a similar vertical section through the valve block, showing the foot pedal depressed to the starting position of the windshield wiper, which is also the position to which the foot pedal is depressed when it is desired to open the washer control valve to permit flow of the cleaning liquid to the windshield.
Figure 4:
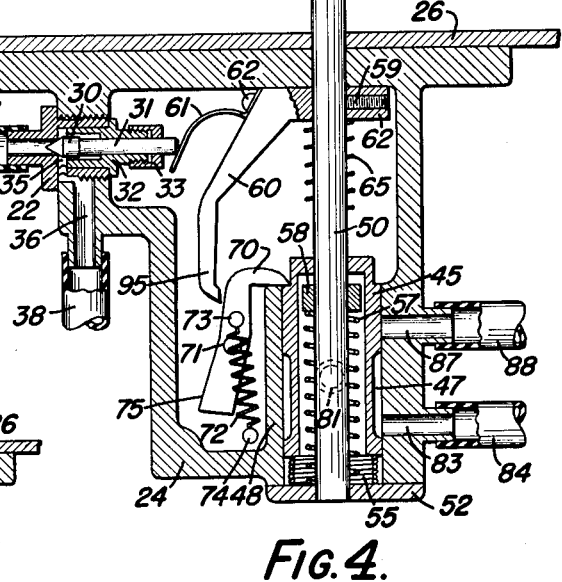
Fig. 4 is a further similar vertical section through the valve block but on a somewhat larger scale, showing the positions of the parts when the windshield wiper alone is in operation.

When the vehicle is in normal operation with the windshield cleaning mechanism inoperative, the rod 50 and foot pedal 53 are in their uppermost positions as shown in Fig. 2, and the leaf spring 61 holds the valve 30 closed. In this position the tube 88 is connected through the ports 87 and 81 with the tube 80 and the wiper blade arms 90 are held at one end of their respective strokes. To put the windshield wiping mechanism into operation, the driver of the vehicle steps on the foot pedal 53 depressing the foot pedal from the position shown in Fig. 2 to that of Fig. 3, and causing the spring 65 to force the valve 45 downwardly against the resistance of the spring 55 to the position shown in Figs. 3 and 4. When the valve 45 reaches this position the detent 70 snaps over the shoulder 46 of the valve under actuation of the spring 72 and locks the valve in this position, as shown in Figs. 3 and 4. In the downward movement of the foot pedeal, the leaf spring 61 will be carried past the right hand end of the valve stem 31, as shown in Fig. 3, and momentarily the valve 30 will be opened by the pressure of the cleaning liquid in the line 21. Thus, some of the cleaning liquid will be squirted on to the windshield from the outlets 41 and 41'.

If the driver only wants to actuate the windshield wipers he releases the foot pedal 53 immediately after depressing it.

The spring 57 will return the rod 50 to its uppermost position instantaneously upon release of the foot pedal 53. In the return of the rod 50 to its uppermost position the leaf spring 61 is re-engaged with the valve stem 31 and the valve 30 is again closed as shown in Fig. 4. Thus, at most, the pressure tank 17 will have had time to squirt only a shot of liquid on the windshield. This will do no harm, for presumably it will be raining anyway when the windshield wipers are actuated. The valve 45 remains locked in its down position, however, as shown in Fig. 4. This shuts off port 87, but causes the port 83 and tubing 84 to be connected with the port 81 and tubing 80. This connects the wiper motor 85 in conventional manner with the suction of the engine 11, putting the windshield wipers 90 into operation.

If the driver wishes to squirt cleaning liquid on the windshield, or wishes to keep the cleaning liquid flowing on the windshield after starting the windshield wipers, he simply depresses the foot pedal 53 to the position shown in Fig. 3. As long as he keeps the foot pedal in that position, the cleaning liquid will be forced by air pressure out of the tank 17 through the lines 21, 38, 40 and 40' onto the windshield. Thus, the driver can give the windshield a shot of cleaning liquid under foot pedal control, or supply cleaning liquid to the windshield as long as he wants and as long as there is a supply of cleaning liquid in the storage tank 17.

Figure 5:
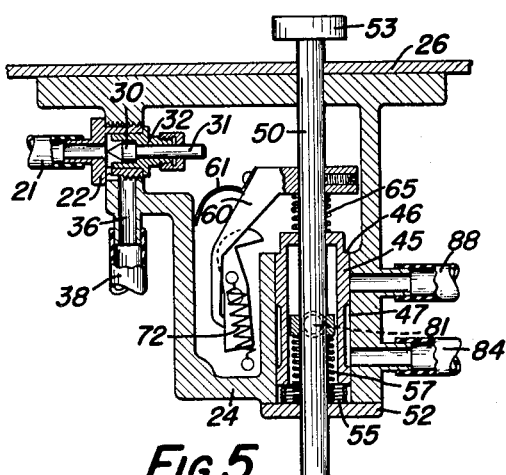
Fig. 5 is a still further similar vertical section showing the foot pedal depressed to its lowermost position to release the wiper valve detent, and permit return of the parts to starting position.

When the operator desires to shut off the windshield wipers and the washing liquid, he pushes the foot pedal down to its lowermost position (Fig. 5). This causes the finger 95 (Fig. 4) of the arm 60 to engage the cam surface 75 of the detent 70, as shown in Fig. 5, and rock this detent about its pivot pin 71 out of engagement with the shoulder 46 of the valve 45. This releases the valve 45; and the valve is returned immediately to its uppermost position by the coil spring 55. As soon as the foot pedal 53 is released it is also returned to uppermost position by action of the coil spring 57. The parts are then restored to the position shown in Fig. 2.

From the preceding description it will be seen that I have provided apparatus for wiping and cleaning a windshield which the driver of the automotive vehicle can operate wholly with his foot and which obviates removal of either hand from the steering wheel either for starting the cleaning mechanism or for stopping it. Furthermore, it will be seen that the cleaning liquid can be applied to the windshield just as long as the operator desires simply by holding down the foot pedal 53. Moreover, the windshield wiper and the apparatus for supplying the cleaning liquid are operated from a single control member, namely, the pedal 53.

While the valving shown is especially adapted, as described, for controlling the operation of a windshield cleaning mechanism it may have other uses where it is desired to control two valves from a single operating member. It will be understood, therefore, that while the invention has been described in connection with a particular embodiment thereof, it is capable of further modification, and this application is intended to cover any variations and uses, of the invention following, in general, the principles of the invention, and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A control mechanism for controlling the operation of windshield wiping and cleaning apparatus comprising, a casing having an inlet for cleaning liquid and an outlet port for conducting said liquid from said casing to the windshield, a valve reciprocably mounted in said casing and controlling connection between said inlet and said outlet port, said casing having a second inlet for connection with the engine manifold of said vehicle, said casing having a pair of ports for connection to the wiper mechanism, a second valve reciprocably mounted in said casing for sliding movement in a direction at right angles to the direction of reciprocation of the first valve to connect at different positions, respectively, of its sliding movement the different ports of said pair of ports with said second inlet, and a single control member slidable in said casing for operating both valves.

2. A control mechanism for controlling the operation of windshield wiping and cleaning apparatus comprising a casing having an inlet for cleaning liquid and an outlet port for conducting said liquid from said casing to the windshield, a valve reciprocably mounted in said casing and controlling connection between said inlet and said outlet port, said casing having a second inlet for connection with the engine manifold of said vehicle, said casing having a pair of ports for connection to the wiper mechanism, a second valve reciprocably mounted in said casing for sliding movement in a direction at right angles to the direction of reciprocation of the first valve to connect at different positions, respectively, of its sliding movement the different ports of said pair of ports with said second inlet, and a foot pedal depressible through the floor board of the automotive vehicle and slidable in said casing to operate both valves.

3. A control mechanism for controlling the operation of windshield wiping and cleaning apparatus comprising a casing having an inlet for cleaning liquid and an outlet port for conducting said liquid from said casing to the windshield, a valve reciprocably mounted in said casing and controlling connection between said inlet and said outlet port, said casing having a second inlet for connection with the engine manifold of said vehicle, said casing having a pair of ports for connection to the wiper mechanism, a second valve reciprocably mounted in said casing for sliding movement to connect at different positions, respectively, of its sliding movement the different ports of said pair of ports with said second inlet, a single control member slidable in said casing for operating both valves, said control member being movable a limited distance in one direction to shift said second valve to a position to connect one of said pair of ports with said second inlet, a detent for detachably locking said second valve in said position, said control member being operable on further movement thereof in said one direction to release said detent, and means operative thereupon to move said second valve in the opposite direction to connect the other of said pair of ports with said second inlet.

4. A control mechanism for controlling the operation of windshield wiping and cleaning apparatus comprising a casing having an inlet for cleaning liquid and an outlet port for conducting said liquid from said casing to the windshield, a valve reciprocably mounted in said casing and controlling connection between said inlet and said outlet port, said casing having a second inlet for connection with the engine manifold of said vehicle, said casing having a pair of ports for connection to the wiper mechanism, a second valve reciprocably mounted in said casing for sliding movement to connect at different positions, respectively, of its sliding movement the different ports of said pair of ports with said second inlet, a single control member connected to the first valve to normally hold said first valve closed but slidable in said casing for operating both valves, said control member being movable a limited distance in one direction to shift said second valve to a position to connect one of said pair of ports with said second inlet and to simultaneously permit connection of the first inlet with the first port, a detent for detachably locking said second valve in said position, said control member being operable on further movement thereof in said one direction to release said detent, and means operative thereupon to move said second valve in the opposite direction to connect the other of said pair of ports with said second inlet.

5. A control mechanism for controlling the operation of windshield wiping and cleaning apparatus comprising a casing having an inlet for cleaning liquid and an outlet port for conducting said liquid from said casing to the windshield, a valve reciprocably mounted in said casing and controlling connection between said inlet and said outlet port, said casing having a second inlet for connection with the engine manifold of said vehicle, said casing having a pair of ports for connection to the wiper mechanism, a second valve reciprocably mounted in said casing for sliding movement to connect at different positions, respectively, of its sliding movement the different ports of said pair of ports with said second inlet, a single control member slidable in said casing for operating both valves, said control member being movable a limited distance in one direction to shift said second valve to a position to connect one of said pair of ports with said second inlet and to permit simultaneously connection of the first inlet with the first port, a detent for detachably locking said second valve in said position, said control member being operable on further movement in said one direction to release said detent, a spring constantly urging said control member to the limit of its movement in the opposite direction, and a spring operative upon release of said detent to move said second valve in the direction opposite to the direction of its first-named movement to connect the other of said pair of ports with said second inlet.

6. A combined wiping and cleaning mechanism for windshields of automotive vehicles comprising a casing having an inlet for cleaning liquid, an outlet port for conducting liquid from said casing to the windshield, means for forcing liquid under pressure into said inlet, a valve reciprocably mounted in said casing and controlling connection of said port with said inlet, a second inlet in said casing connected with the engine manifold of said vehicle, a pair of ports in said casing connected with said wiper mechanism, a second valve reciprocably mounted in said casing for movement at right angles to the movement of the first valve, a spring constantly urging said second valve in one direction to connect one of said pair of ports with said second inlet, a control member reciprocable in said casing in a direction parallel to the direction of movement of said second valve, a spring constantly urging said control member in one direction, a member carried by said control member for holding said first valve closed when said control member is at the limit of its movement in said one direction, means operatively connecting said control member to said second valve to move said second valve against the resistance of said first spring when said control member is moved a limited distance against the resistance of the second spring to a position to connect the other of said pair of ports with said second inlet, a detent for locking said second valve in said position, and means carried by said control member which is operable when said control member is moved a further distance against the resistance of said second spring to release said detent.

7. A combined wiping and cleaning mechanism for windshields of automotive vehicles comprising a casing having an inlet for cleaning liquid, an outlet port for conducting liquid from said casing to the windshield, means for forcing liquid under pressure into said inlet, a valve reciprocably mounted in said casing and controlling connection of said port with said inlet, a second inlet in said casing connected with the engine manifold of said vehicle, a pair of ports in said casing connected with said wiper mechanism, a second valve reciprocably mounted in said casing for movement at right angles to the movement of the first valve, a spring constantly urging said second valve in one direction to connect one of said pair of ports with said second inlet, a control member reciprocable in said casing and relative to and through said second valve in a direction parallel to the direction of movement of said second valve, a spring constantly urging said control member in one direction, a member carried by said control member for holding said first valve closed when said control member is at the limit of its movement in said one direction, a spring interposed between said control member and said second valve to transmit motion of said control member to said second valve to move said second valve against the resistance of said first spring when said control member is moved a limited distance against the resistance of the second spring to a position to connect the other of said pair of ports with said second inlet, a spring-pressed detent for locking said second valve in said position, and an arm carried by said control member which engages and releases said detent when said control member is moved a further distance against the resistance of said second spring.

8. A combined wiping and cleaning mechanism for windshields of automotive vehicles comprising a casing having an inlet for cleaning liquid, an outlet port for conducting liquid from said casing to the windshield, means for forcing liquid under pressure into said inlet, a valve reciprocably mounted in said casing and controlling connection of said port with said inlet, a second inlet in said casing connected with the engine manifold of said vehicle, a pair of ports in said casing connected with said wiper mechanism, a second valve reciprocably mounted in said casing for movement at right angles to the movement of the first valve, a spring constantly urging said second valve in one direction to connect one of said pair of ports with said second inlet, a control member reciprocable in said casing and relative to and through said second valve in a direction parallel to the direction of movement of said second valve, a spring constantly urging said control member in one direction, a member carried by said control member for holding said first valve closed when said control member is at the limit of its movement in said one direction, a spring interposed between said control member and said second valve to transmit motion of said control member to said second valve to move said second valve against the resistance of said first spring when said control member is moved a limited distance against the resistance of the second spring to a position to connect the other of said pair of ports with said second inlet, a spring-pressed detent for locking said second valve in said position, an arm carried by said control member which engages and releases said detent when said control member is moved a further distance against the resistance of said second spring, and a foot pedal operatively connected to said control member to operate the same against the resistance of said second spring.

9. A valve mechanism comprising a casing having an inlet, an outlet port, a reciprocable valve controlling connection between said inlet and said port, a second inlet, a pair of outlet ports, a second valve reciprocably mounted in said casing, a spring urging the second valve constantly in one direction to connect one of said pair of outlet ports with the second inlet, a control member reciprocable in said casing, a second spring constantly urging the control member in one direction, means carried by said control member operable when said control member is at the limit of its movement in said one direction to hold said first valve closed, means operatively connecting said control member to said second valve to move said second valve against the resistance of said first spring to a position to connect the other of said pair of ports with said second inlet when said control member is moved a limited distance against the resistance of the second spring, a detent for locking said second valve in said position, said control member being movable a further distance against the resistance of said second spring to release said detent.

10. A valve mechanism comprising a casing having an inlet, an outlet port, a reciprocable valve controlling connection between said inlet and said port, a second inlet, a pair of outlet ports, a second valve reciprocably mounted in said casing, a spring urging the second valve constantly in one direction to connect one of said pair of outlet ports with the second inlet, a control member reciprocable axially in said second valve and in said casing in the same direction as said second valve, a second spring constantly urging the control member in one direction, means carried by said control member operable when said control member is at the limit of its movement in said one direction to hold said first valve closed, means operatively connecting said control member to said second valve to move said second valve against the resistance of said first spring to a position to connect the other of said pair of ports with said second inlet when said control member is moved a limited distance against the resistance of the second spring, a spring-pressed detent for locking said second valve in said position, and an arm carried by said control member which engages said detent when said control member is moved a further distance against the resistance of said second spring to release said detent.

11. A valve mechanism comprising a casing having an inlet, an outlet port, a reciprocable valve controlling connection between said inlet and said port, a second inlet, a pair of outlet ports, a second valve reciprocably mounted in said casing for sliding movement in a direction at right angles to the direction of reciprocation of the first valve, a spring urging the second valve constantly in one direction to connect one of said pair of outlet ports with the second inlet, a control member reciprocable in said casing in the same direction as the second valve, a second spring constantly urging the control member in one direction, means carried by said control member operable when said control member is at the limit of its movement in said one direction to hold said first valve closed, means operatively connecting said control member to said second valve to move said second valve against the resistance of said first spring to a position to connect the other of said pair of ports with said second inlet when said control member is moved a limited distance against the resistance of said second spring, a detent for holding said second valve in said position, and means connected to said control member and operable to release said detent when said control member is moved a further distance against the resistance of said second spring.

12. A valve mechanism comprising a casing having an inlet, an outlet port, a reciprocable valve controlling connection between said inlet and said port, a second inlet, a pair of outlet ports, a second valve reciprocably mounted in said casing for sliding movement in a direction at right angles to the direction of reciprocation of the first valve, a spring urging the second valve constantly in one direction to connect one of said pair of outlet ports with the second inlet, a control member reciprocable in said casing in the same direction as the second valve, a second spring constantly urging the control member in one direction, a leaf spring carried by said control member to engage said first valve when said control member is at the limit of its movement in said one direction to hold said first valve closed, means operatively connecting said control member to said second valve to move said second valve against the resistance of said first spring to a position to connect the other of said pair of ports with said second inlet when said control member is moved a limited distance against the resistance of said second spring, a detent for holding said second valve in said position, and means connected to said control member and operable to release said detent when said control member is moved a further distance against the resistance of said second spring.

13. A valve mechanism comprising a casing having an inlet, an outlet port, a reciprocable valve controlling connection between said inlet and said port, a second inlet, a pair of outlet ports, a second valve reciprocably mounted in said casing for sliding movement in a direction at right angles to the direction of reciprocation of the first valve, a spring urging the second valve constantly in one direction to connect one of said pair of outlet ports with said second inlet, a control member mounted coaxially of said second valve to reciprocate therein and in said casing in the same direction as said second valve, a second spring constantly urging the control member in one direction, an arm carried by said control member, a leaf spring mounted on said arm to engage said first valve when said control member is at the limit of its movement in said one direction to hold said first valve closed, a spring interposed between said control member and said second valve to transmit motion of said control member to said second valve against the resistance of said first spring when said control member is moved against the resistance of said second spring, whereby to move said second valve to a position to connect the other of said pair of ports with said second inlet when said control member is moved a limited distance against the resistance of said second spring, and a spring-pressed detent for holding said second valve in said position when moved thereto, said arm being disposed to engage said detent to release the same when said control member is moved a further distance against the resistance of said second spring.

14. The combination in an automotive vehicle of wiper means for wiping the windshield of the vehicle, means for applying a cleaning liquid to the windshield, a source of supply of said cleaning liquid, means for conducting said liquid from said source of supply to said applying means, a movable control member for said wiper means, said control member being movable in one direction to effect operation of said wiper means and being movable in the opposite direction to stop operation of said wiper means, means constantly urging said control member in said opposite direction, a valve movably disposed in said conducting means for controlling flow of cleaning liquid to said applying means, means constantly urging said valve to closed position, a single slidable member reciprocably mounted in the vehicle, means operatively connecting said slidable member both to said control member and to said valve to move said control member in said one direction and to open said valve upon limited sliding movement of said slidable member in one direction, resilient means for constantly urging said slidable member in the opposite direction, means for locking said control member in wiper-means operating position upon said limited sliding movement of said slidable member, and means connected to said slidable member for disengaging said locking means upon movement of said slidable member in said one direction of its movement beyond said limited sliding movement.

References Cited in the file of this patent

UNITED STATES PATENTS

| Number | Name | Date |
|---|---|---|
| 706,423 | Kleinfeldt | Aug. 5, 1902 |
| 1,752,934 | Townsend et al. | Apr. 1, 1930 |
| 1,932,615 | Bumpass | Oct. 3, 1933 |
| 2,206,814 | Horton | July 2, 1940 |
| 2,632,471 | Horton | Mar. 24, 1953 |